(12) United States Patent
Davis

(10) Patent No.: US 8,447,227 B2
(45) Date of Patent: May 21, 2013

(54) JUKEBOX SYSTEM

(76) Inventor: Simon Davis, London (GB)

( * ) Notice: Subject to any disclaimer, the term of this patent is extended or adjusted under 35 U.S.C. 154(b) by 0 days.

(21) Appl. No.: 12/735,413

(22) PCT Filed: Jan. 14, 2009

(86) PCT No.: PCT/EP2009/050392
§ 371 (c)(1),
(2), (4) Date: Jul. 14, 2010

(87) PCT Pub. No.: WO2009/090194
PCT Pub. Date: Jul. 23, 2009

(65) Prior Publication Data
US 2010/0311400 A1 Dec. 9, 2010

(30) Foreign Application Priority Data
Jan. 14, 2008 (GB) .................................. 0800567.0

(51) Int. Cl.
*H04H 40/00* (2008.01)

(52) U.S. Cl.
USPC ...... 455/3.06; 455/3.05; 455/3.03; 455/414.1

(58) Field of Classification Search
USPC .............. 455/414.1, 414.2, 414.3, 3.05, 3.06, 455/403, 3.03, 3.04; 709/204, 229, 226, 231, 709/218, 203; 725/1, 63, 135, 142, 134, 87, 725/109, 110, 115; 705/1, 5, 14, 25, 26, 27; 715/716
See application file for complete search history.

(56) References Cited

U.S. PATENT DOCUMENTS

| | | | |
|---|---|---|---|
| 7,548,851 B1 * | 6/2009 | Lau et al. ....................... | 704/201 |
| 7,822,687 B2 * | 10/2010 | Brillon et al. ................... | 705/59 |
| 2001/0003188 A1 * | 6/2001 | Kikinis ........................ | 709/203 |
| 2005/0044254 A1 * | 2/2005 | Smith .......................... | 709/231 |
| 2005/0132405 A1 * | 6/2005 | AbiEzzi et al. ................. | 725/61 |
| 2006/0239131 A1 * | 10/2006 | Nathan et al. ............. | 369/30.06 |
| 2008/0086379 A1 * | 4/2008 | Dion et al. ...................... | 705/14 |
| 2008/0108301 A1 * | 5/2008 | Dorenbosch ................ | 455/3.06 |
| 2012/0158531 A1 * | 6/2012 | Dion et al. ................... | 705/26.1 |

* cited by examiner

*Primary Examiner* — Jean Gelin
(74) *Attorney, Agent, or Firm* — William H. Bollman

(57) ABSTRACT

A jukebox is described where users having mobile telephones can access a server (2) located remote from the jukebox location and select tracks for playing on the jukebox at the user's location. The user's mobile telephone communicates on WAP or WEB on a mobile with the server (2) thereby allowing the user to view any information relating to the tracks selectable on the jukebox at the user's location. The user's selection is transmitted to the jukebox via a wireless communications network and the track played at the user's location. The communication between the remote server (2) and the jukebox allows information such as track lists selectable and information relating to the tracks to be remotely accessed by owners to allow suitable track lists to be provided for selection for different venues or different times of the day or of the year. For example, all rock songs could be removed from the selection list after 11 pm at night.

5 Claims, 1 Drawing Sheet

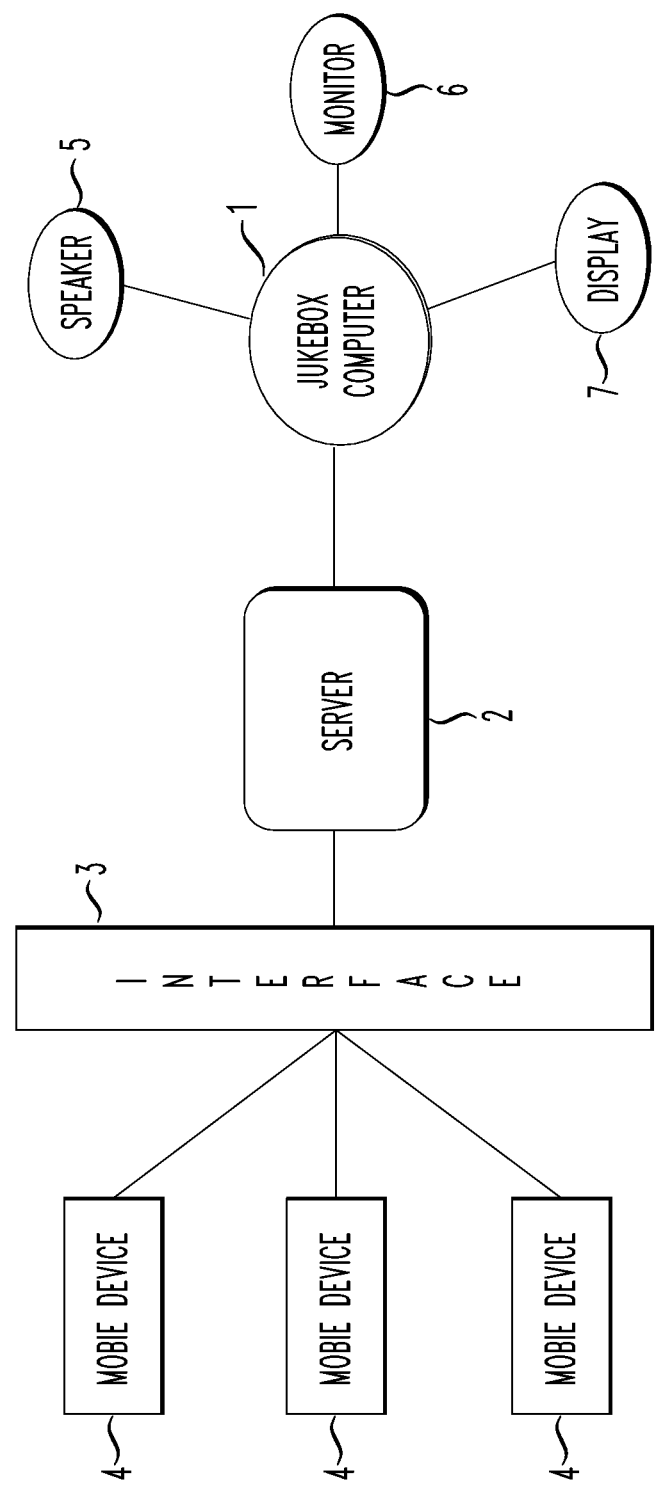

JUKEBOX SYSTEM

The invention relates to a jukebox system. More specifically but not exclusively, it relates to a method and system of selecting tracks on a jukebox.

A jukebox is a machine in a public place which allows customers to select tracks of audio, video or other content which are then played in that venue. Traditionally the tracks are selected by manually keying in a code relating to a given track. Typically these numbers are printed on cards displayed in the jukebox. The music is stored on vinyl record or CD and an appropriate playing device is included in the jukebox. The jukebox may or may not be coin operated, or sometimes credit or debit card operated, but the selection of a track need not be dependent on income.

In recent years there has been a tendency to replace such jukeboxes with digital jukeboxes. In these digital systems, the CD or record is replaced by a storage device such as a hard drive containing the music in a digital form. When replacing the physical player described above with a software player, the code cards are typically replaced by a touch-screen and the code with an image of the artist or a text file. Such a digital jukebox offers new opportunities to search for a track, as in a digital form the track can be described in an associated metadata file and then displayed using and according to that metadata. For example a track may be described in its metadata as a 'Million Seller of the 80's', a 'Number One Of The 80's', a 'Male Star Of The 80's', a 'Soul Track', a 'Slow Track—110 bpm' and when searching for this track on the jukebox, this information can appear in every one of its metadata descriptions. A digital jukebox may also contain a great many more tracks than CD or Record jukeboxes because those tracks are either stored on a hard-drive or streamed as requested via broadband and played. The number of tracks that can be accessed via a digital jukebox is now only limited by the number of tracks that have ever been recorded.

There are significant problems with the jukeboxes described above. For example, only a single person can search a jukebox at anyone time for the track they want to play. This selection process can also be very time consuming, stopping other potential users from accessing the jukebox. The process of picking a track may also be intimidating as potential users are not always confident of their musical tastes and suspect that they might be ridiculed for their selections. Potential users may also struggle to find the exact coins required if the jukebox is charging per play. A jukebox is also subject to wear and tear in a public location and therefore subject to damage and the need for the owner of the jukebox to fix any problems A method of overcoming these problems is described in patent publication numbers GB2397685 and GB2411510. These documents describe a method of selecting a track on a modified jukebox using a mobile device such as a mobile phone. Such selection, as described in these documents, is communicated via Short Messaging System (SMS), known as a text message, over a wireless communications network to a modified jukebox which automatically processes the instruction and plays the selected track. The modified jukebox may be a Record, CD or Digital jukebox.

The system described in the published GB patent applications, assumes that the user makes a selection from a list of SMS messaging options and transmits a code to data processing means where the code is interpreted by the data processing means to initiate provision of the selected track. In accordance with this aspect of the invention a text message containing a code is sent directly to a number for the provider of the track.

However this process is limited due to the limitations of SMS messaging. SMS messaging is limited to 160 characters, which significantly limits the number of tracks and codes that can be displayed. For example, a SMS message requesting Abba tracks would result in a return SMS message detailing a maximum of 8 unique tracks. Abba had 26 hits in the UK alone and that is before any album tracks are considered. Of course, further SMS messages could be sent containing more selections, but the process then becomes very cumbersome which is guaranteed to affect the user experience which will in turn affect the income potential of the jukebox.

SMS, often called text messaging, is a known means of sending short messages to and from mobile phones. Text messages travel over a mobile telephone network through the Short Message Service Centers (SMSC), which are network elements in the mobile telephone network capable of processing a certain amount of messages per second, for example 10000 SMS per second.

The present invention aims to overcome the problems associated with traditional jukeboxes or the systems described in the above patent publications.

According to the invention there is provided a system for playing audio and/or video tracks on a jukebox computer in response to requests transmitted by users, said users having mobile telecommunication devices capable of communication with a server over a wireless communications network, said jukebox also being capable of communication with said server over the wireless communications network, the jukebox computer providing a predetermined plurality of tracks, information relating to said plurality of tracks being stored on the server, wherein the users select said tracks by communicating with the server, the server transmitting the user's request to the jukebox computer over the wireless communications network.

According to one form of the invention there is further provided a jukebox computer for location in a public place, said jukebox computer comprising receiving means for receiving requests for audio and/or video tracks to be played, processing means for processing received requests, storage means for storing said requests and said tracks and playback means capable of playing back said requested tracks, wherein the requests are received via a wireless telecommunications network from a remote server, the remote server being capable of processing requests for information from users having mobile telecommunication devices in the public place communicating via WAP or WEB on the mobile telecommunications device.

The invention will now be described with reference to the accompanying diagrammatic drawings in which;

FIG. 1 is a flow diagram showing the main elements and communications between the main elements in one form of the invention.

In a first embodiment of the invention, the system comprises a jukebox computer 1 connected to speakers 5 and or some form of monitor 6. The monitors 6 may be television screens, plasma or LCD displays, projectors or other suitable display devices. The computer 1 is connected via a mobile telephone data connection to a server 2. The server 2 is located remote from the jukebox 1. It will be appreciated that many jukebox computer 1s 1 may be connected to a single server 2. The jukebox computer 1 receives tracks via the mobile data connection from the server 2 and the jukebox computer 1 stores these tracks on a suitable storage device located therein, such as a hard disc drive.

On installation of a jukebox computer 1 in a suitable venue, the mobile data connection with the remote server 2 is established. Through a suitable modem, the jukebox computer 1 logs into an FTP site by sending its unique client number and password which allows access to specific venue folders on the server 2.

FTP or File Transfer Protocol is a known system used to transfer data from one computer to another over the Internet, or through a network. Specifically, FTP is a commonly used protocol for exchanging files over any network that supports the TCP/IP protocol (such as the Internet or an intranet). Typically there are two computers involved in an FTP transfer, a server 2 and a client, which in this embodiment of the invention are the server 2 and a jukebox computer 1 respectively. The FTP server 2, running FTP server software, listens on the network for connection requests from jukebox computer 1. The jukebox computer 1, running FTP client software, initiates a connection to the server 2. Once connected, the client can do a number of file manipulation operations such as uploading files to the server 2, download files from the server 2, rename or delete files on the server 2 etc.

As described above, the connection between the server 2 and the jukebox computer 1 can be established by known techniques. In order for this embodiment of the invention to be successful it is now necessary to explain the process of communication between the jukebox user 4, and his mobile device 4, and the server 2. As the object of the invention is to communicate between the user 4 and the jukebox computer 1, it is now necessary to describe the method used to exchange data between the jukebox computer 1 and the mobile device 4 using the FTP protocol. This communication is established using WAP or WEB on the mobile device 4.

WAP or WEB on a mobile device 4 is an open international standard for applications that use wireless communication. The principal application for WAP/WEB is to enable access to the internet from a mobile device. When a mobile device is connected to the internet, any internet service may be used, for example, a data exchange using the FTP protocol. Advantageously, by virtue of WAP/WEB a mobile device which is not necessarily a true computer, can be seen as a "real computer" from the point of view of the internet.

PHONE---(wap/web protocol)-->WAP/WEB SERVER 2--(ftp protocol)-->JUKEBOX COMPUTER 1

Data exchanged between the mobile device 4 and the jukebox computer 1 is via a common computer file, in binary, in text or any combination of the two. In addition, data encryption is used to add a protection to the information. The size of data files required depends on the information exchanged. It can be anything from a few bytes for example 16 bytes for a play command but it can easily go up or over 128 Kbytes for a profile exchange. To make a comparison, to exchange this amount of data using an SMS jukebox as described in the prior art documents, would need more than 800 messages.

In use, software running on the jukebox computer 1 via Bluetooth or a similar "open always" technology confirms the existence of this system to any suitable mobile device 4, such as a mobile telephone or PDA. The Bluetooth software searches for all available mobile devices 4 which are visible in a venue. Any visible mobile devices 4 in a venue will be asked if they wish to receive jukebox information from that venue. The name of the venue is included in the Bluetooth message which for example might say "Will you accept data from The Dog and Duck?" This information is received via the mobile data connection from the server 2 and stored on the jukebox computer 1. The user of the mobile device 4 can act in one of three ways if they are visible via Bluetooth. They can ignore the message and they will be resent the message a programmable number of times before their mobile device is removed for a programmable period of time. For example, if the user ignores the message three times they will not be sent the message for 12 hours. The user can then choose to NOT accept the message at which point they will not be resent the message for a programmable period of time, for example not for 12 hours. Furthermore, the user can accept the message at which point they will receive a file which may be text, picture or video promoting the mobile jukebox via a SMS promotion. For example, the mobile device 4 may display a message "To choose the next track on the jukebox text Juke to 84222." If the user accepts the message they will not be sent a new message for a programmable period of time, for example 12 hours. Every message sent via Bluetooth can be different and each mobile device may require a different screen size and a different number of colours.

SMS requirements to join in the system can also be advertised throughout the venue on printed and digital media.

When a user 4 follows the instructions detailed in the SMS requirements or messages, and texts the designated trigger word to the short code then this information is delivered to the remote server 2 and a SMS message is returned detailing a WAP or WEB on the mobile link. Each WAP or WEB on the mobile link is a unique combination of characters so a user can be tracked throughout their WAP or WEB on the mobile experience The jukebox computer 1 runs a suitable software program that creates a list of selectable tracks. This list is mirrored on the server 2 and any change to the list of available tracks on the jukebox 1 is automatically sent to the server 2. For example if a site owner deletes a track on the jukebox 1 this will automatically be mirrored on the server 2. The system will also work in reverse so that any change to the server 2 will be automatically mirrored on the jukebox 1. In this way track selections can also be made onsite in a traditional way by selecting the track on a touch screen or display system 7. This list could be the track name/title/unique number or any other identifying feature in a text or other file. This list is also created every time the jukebox computer 1 is rebooted or restarted. The list may only be a fraction of the total available tracks, but details the selectable tracks in that time period. At regular intervals the jukebox computer 1 dials the server 2 and, if the dial up follows a reboot or changes in the selectable list on the jukebox computer 1, so the new list is updated to the server 2. Alternatively the server 2 can dial the jukebox computer 1 and download any new lists as they exist in a specific folder in the jukebox computer 1 software.

The WAP or WEB on the mobile site is only ever a reflection of the selectable tracks on each individual jukebox in that time period. The selectable tracks may change on numerous triggers throughout the day or night as the venue owner creates new profiles from which the users can select and play tracks.

The jukebox computer 1 allows for the creation of profiled periods when only certain tracks will be made selectable. The software allows for filters to be created which filter out or in any tracks containing certain data in the metadata associate with each track. When the filters have been completed the final track list can be named and programmed to become active (selectable) at times of the day, night, week, month or year. For example Christmas tracks are programmed to only become selectable on December 1 and then disappear on the December 26.

In use, software is running on the WAP or mobile WEB sites which locates the venue jukebox. The user 4 is asked to select a number of letters from the name of the venue, for example "please enter the first three letters of the venue." These letters are compared to a list of jukebox computer 1s 1 on the server 2 that have established a mobile data link with the server 2. If multiple venues exist with the same letter combination then the customer is asked to select between the various potential sites, for example DOG may return the Dog & Duck in Hendon and the Dog and Duck in Rye. The user 4 selects the actual jukebox computer 1 they wish to view and a new WAP or WEB on the mobile page is opened detailing various search options at that specific jukebox computer 1.

The search options at WAP or mobile WEB sites are potentially different for each specific jukebox computer 1 and reflect the actual selectable tracks at that time of the day, night, week, month or year on that specific jukebox computer 1. For example when a customer selects an A-Z search on the WAP or WEB on the mobile and searches for Abba they will only see the Abba tracks that are selectable in the time period.

Software is running on the WAP or mobile WEB site hosted on a server 2 which allows the search for the Top 20 Chart on any day of the week since 1960. The number of tracks featured in the Chart is optional. The user is asked to enter a date into the WAP or WEB on the mobile site. The software compares the inputted date to a calendar detailing every week since 1960 and identifies the closest Sunday, for example 10.02.2007 is closest to Sunday 07.02.2007. Sunday is the day on which the new Top 20 is published and a database exists on the server 2 containing every Sunday Top 20 since 1960. Again the number of tracks on the server 2 is a variable. This is compared to the closest Sunday as inputted by the customer and a list is created of the Top 20 tracks on that Sunday. The list is displayed on the WAP or WEB on the mobile site which the customer can view and select. Each entry in the list is associated with the actual track via a unique identifier which exists in the database of every Sunday Top 20 since 1960 and the metadata associated with the track. This ensures that the correct track is played when selected. In the case where the jukebox computer 1 is profiled and only certain tracks are selectable the Top 20 is compared to the list of selectable tracks and although the full list of Top 20 tracks could be displayed, only the selectable tracks are playable in the venue.

Software may be running on the WAP or WEB mobile site which details the most played tracks on the jukebox computer 1. The jukebox computer 1 monitors the play of every track and reports this play information regularly to the server 2. This information can either be downloaded by the server 2 or uploaded by the jukebox computer 1. This information is a list of every song played including the time and date. Software running on a server 2 keeps a database of all this information and allows a user to create a date period, for example 03.11.2007 to 22.11.2007 and list all the tracks that were played in that date period in the order of most to least played. These tracks can then be displayed on the WAP or WEB on the mobile site. In the case where the jukebox computer 1 is profiled and only certain tracks are selectable the list of the most played in a date period is compared to the list of selectable tracks and although the full list of played tracks could be displayed, only the selectable tracks are playable in the venue.

The 'most played track' software may also be adapted to calculate the most played in a date period across every jukebox computer 1 connected to the server 2. This information will then be displayed as a jukebox chart on the WAP or WEB mobile site. In the case where the jukebox computer 1 is profiled and only certain tracks are selectable the jukebox chart is compared to the list of selectable tracks and although the full jukebox chart tracks could be displayed, only the selectable tracks are playable in the venue.

Accordingly, it will be appreciated that this invention provides for a selection process which accommodates the significant choice available on the jukebox and creates a positive user experience which will not affect the revenue potential.

As previously discussed, the advantages of such a WAP or WEB on a mobile device system over an SMS system is the fact that SMS system only provides for 160 characters in every SMS message, so any message is extremely restricted, whereas the equivalent WAP or WEB system can be much more detailed. Thus a jukebox computer 1 which may provide access to a multitude of tracks is restricted by the number of search results it can return. For example if you were to advertise the Top 40 you would require an estimated 5 SMS messages in order to view all the possible selections. All the messages would have to arrive consecutively and each SMS message would require a search and open process on the mobile device. The whole experience would be perceived as negative and the service would not succeed.

Advantageously, the present invention does not require the use of printed cards in the venue associated with each jukebox, as may be required in the system described in GB2397685 and GB2411510. In these systems, the customer may choose a track from a printed menu but these menus are easily lost and damaged and need replacing with every update of tracks. This is both expensive and reliant on the owner of the venue ensuring that the menus are placed on the tables regularly and the updated menus replace the older ones.

A further advantage of the present system is that the jukebox computer 1s may be profilable such that certain types of music can be added or removed from the selection and search screens at different times of the day and night. The reason for this is to ensure that even where music is being selected by a customer so it is the right music for that time of the day or night ensuring the right atmosphere.

Significantly the jukeboxes can be profiled such that the selectable tracks vary throughout the day, week and month, for example Irish content may be available only for St Patrick's Day and no other day of the year. In the prior art systems, these changes to the selectable tracks cannot be updated in any printed material and simply telling a customer that a track is not available via a SMS message will result in complaints from customers who are paying for every SMS message.

In the system described in GB2397685 and GB2411510 the list from which the user selects tracks could be printed or displayed on screens within the venue or detailed in an exchange of SMS messages. The listing of the tracks may be available in the public venue in any number of ways but includes menus and posters and video monitors, TV's, plasma, LCD, projectors or other display devises. For example the user could text Abba to the jukebox and the jukebox could detail the available Abba tracks either as a return SMS message or displayed in the venue.

However, the present system of jukebox computer 1s allows for a significant number of tracks to be accessed and/or stored. The minimum number of tracks that may be preinstalled is 6500 but the system allows for installation of typically 30,000 tracks preinstalled. For reference, these 30,000 track jukeboxes contain every Top 40 hit since 1952. It would be impractical and almost impossible to advertise in a printed form or onscreen this number of tracks as described in systems detailed in GB2397685 and GB2411510.

It will be appreciated that jukebox systems operated in accordance with this invention ensure that the customer is only viewing tracks at the WAP or WEB on the mobile site which are selectable and will be played.

Additionally, it will be appreciated that the system allows for a service where the user could decide to select and then play the track on more than one jukebox computer 1. For example, the customer could decide to select and play the track on all of the jukeboxes in their village or city or country.

There could also be an option to programmed the time at which the track would be played.

The invention claimed is:

1. A jukebox computer located in a public space, comprising:
- means for receiving a request for at least one of an audio and video track to be played;
- means for processing said received request;
- means for storing said received request and said at least one of an audio and video track; and
- means for playback to play said requested at least one of an audio and video tracks;
- wherein said means for receiving comprises a means for wireless communication from a remote server, said remote server being operable to process requests for information from mobile telecommunication devices in said public place and to communicate with said mobile telecommunication devices via at least one of a Wireless Access Point (WAP) and WEB-site hosted by said remote server; and
- wherein said jukebox computer is comprised of wireless technology, operable to send a message, indicating an existence of said jukebox computer to any of said mobile telecommunication devices wirelessly visible in a venue, and if said message is accepted, said juke box computer being operable to send a message to a particular mobile telecommunication device detailing at least one of said WAP and WEB-link for selecting said at least one of audio and video tracks.

2. A jukebox located in a public space according to claim 1, wherein:
said wireless technology is Bluetooth™.

3. A jukebox located in a public space according to claim 1, further comprising:
at least one display unit operable to display to users in said public place a message which is associated with a requested track.

4. A method of operating a jukebox computer in a public place, comprising:
- receiving, via a receiving means, a request for at least one of audio and video tracks to be played;
- processing, via a processing means, said received request;
- storing, via a storage means, said requests; and
- playing, via tracks playback means, requested tracks;
- wherein said receiving means comprises a wireless communication means from a remote server, said remote server being operable to process said received request for information from mobile telecommunication devices in said public place and to communicate with said mobile telecommunication devices via at least one of a Wireless Access Point (WAP) and WEB site hosted by said remote server; and
- sending, using wireless technology, a message, indicating an existence of said jukebox computer to any of said mobile telecommunication devices wirelessly visible in a venue, and, if said message is accepted, sending a message to a particular mobile telecommunication device detailing at least one of said WAP and WEB-link for selecting said at least one of audio and video tracks.

5. The method of operating a jukebox computer in a public place according to claim 4, wherein:
said wireless technology is Bluetooth™.

* * * * *